US012395698B2

(12) United States Patent
Gupta et al.

(10) Patent No.: US 12,395,698 B2
(45) Date of Patent: Aug. 19, 2025

(54) SYSTEMS AND METHODS FOR PROVIDING MEDIA CONTENT

(71) Applicant: Adeia Guides Inc., San Jose, CA (US)

(72) Inventors: Vikram Makam Gupta, Karnataka (IN); Vishwas Sharadanagar Panchaksharaiah, Karnataka (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 18/403,582

(22) Filed: Jan. 3, 2024

(65) Prior Publication Data

US 2024/0147003 A1   May 2, 2024

Related U.S. Application Data

(63) Continuation of application No. 17/245,665, filed on Apr. 30, 2021.

(51) Int. Cl.
*H04N 21/442*   (2011.01)
*H04N 21/45*   (2011.01)

(52) U.S. Cl.
CPC .  *H04N 21/44218* (2013.01); *H04N 21/44204* (2013.01); *H04N 21/44222* (2013.01); *H04N 21/4532* (2013.01)

(58) Field of Classification Search
None
See application file for complete search history.

(56) References Cited

U.S. PATENT DOCUMENTS

| | | | |
|---|---|---|---|
| 2014/0373057 A1 | 12/2014 | Hoffert et al. | |
| 2015/0254345 A1 | 9/2015 | White | |
| 2016/0094875 A1 | 3/2016 | Peterson et al. | |
| 2017/0280434 A1 | 9/2017 | Begeja et al. | |
| 2018/0352275 A1* | 12/2018 | Alexander | H04L 67/55 |
| 2019/0026274 A1 | 1/2019 | Deng et al. | |
| 2019/0377749 A1 | 12/2019 | Manning et al. | |
| 2020/0126100 A1* | 4/2020 | Goyal | H04N 21/812 |
| 2022/0353573 A1 | 11/2022 | Gupta et al. | |

* cited by examiner

*Primary Examiner* — Nasser M Goodarzi
*Assistant Examiner* — Charles N Hicks
(74) *Attorney, Agent, or Firm* — HALEY GUILIANO LLP

(57) ABSTRACT

Systems and associated methods are described for providing media content. The system retrieves from memory a media consumption pattern profile, which includes first and second media characteristics associated as a pattern of media consumption and a time duration indicating how long a first media content item having the first media characteristic was output by a user device before the user device changed to outputting a second media content item having the second media characteristic. The system outputs a media content item onto the user device. In response to detecting the media content item has the first media characteristic and has been output for the time duration, the system outputs a third media content item having the first and second media characteristics onto the user device and after outputting the third media content item, outputs a fourth media content item having the second media characteristic onto the user device.

19 Claims, 13 Drawing Sheets

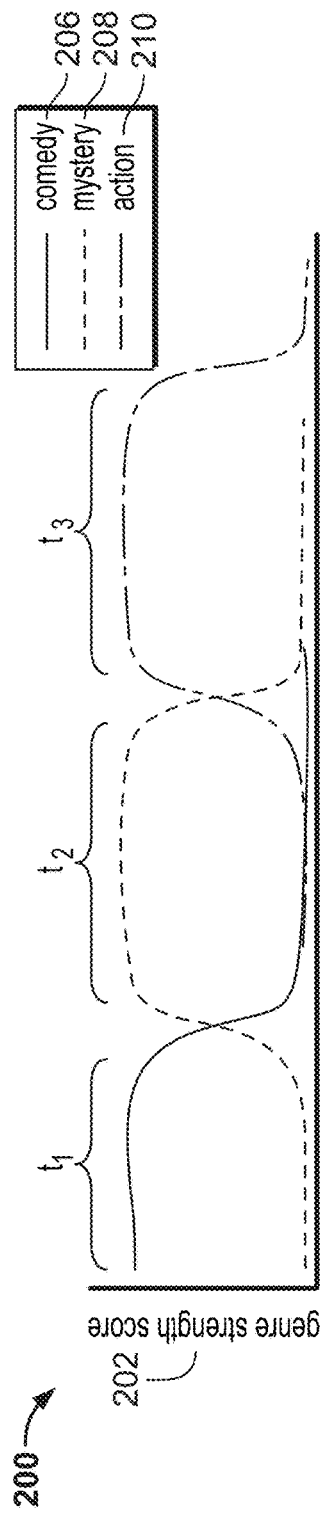
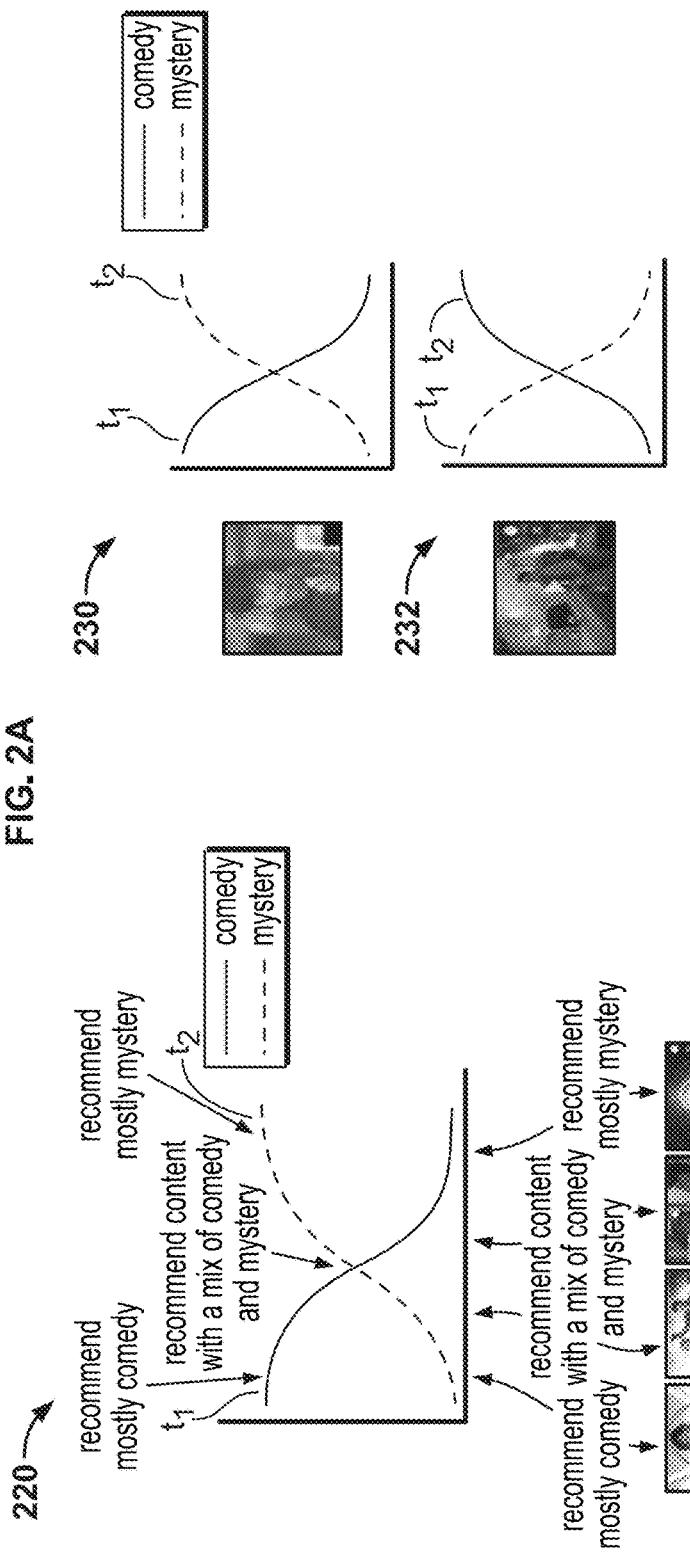
FIG. 2A
FIG. 2B
FIG. 2C

SYSTEMS AND METHODS FOR PROVIDING MEDIA CONTENT

CROSS-REFERENCE TO RELATED APPLICATION

This application is a continuation of U.S. patent application Ser. No. 17/245,665, filed Apr. 30, 2021, the disclosure of which is hereby incorporated by reference herein in its entirety.

BACKGROUND

This disclosure relates to systems and methods for providing media content to a user, and more particularly, to systems and methods for dynamically outputting media content based on a media consumption pattern indicating time duration of different media characteristics of media content consumed by the user.

SUMMARY

Modern media distribution systems enable a user to access more media content than ever before. However, given the large variety of media providers and media content available to users of media services (e.g., cable, broadcast, satellite, over-the-top provider), it may be a challenging task to not only continuously provide media content that will be consumed by the user but also provide a smooth transition of media content of different characteristics for an improved user's visual experience in real time.

In one approach, when a user is consuming media content with a specific media characteristic (e.g., a specific genre) on a user device, a system will automatically provide (e.g., by auto playing) other media content with the same media characteristic. For example, when a user is watching a media content of comedy genre online on YouTube™ or other short video platforms with active auto-play in an ON mode the platform will commonly auto-play other short videos in the comedy genre. However, often a user may lose interest in the media with a media characteristic and will not want to watch the comedy genre media content while the system continues to provide this comedy genre media content onto the user device for a long time. In one example, while the system continues to provide the comedy genre media content, the user may wish to watch media content of a mystery genre. In this approach, in order for the user to switch watching to the media content of the mystery genre, the user has to manually search for and select the media content of the mystery genre. Also, this drastic switch of the media content of the comedy genre to the mystery genre provides an overall unpleasant viewing experience to the user. Moreover, with the auto-play in the ON mode, the media content of the same characteristics is continuously provided onto the user device, which causes the user device to consume resources such as a large amount of processing power and will require a huge quantity of media content being provided at a high bandwidth on a network when the user is not consuming the media content resulting in wastage of these resources.

In some embodiments, to overcome these problems, methods and systems for dynamically providing media content recommendations to the user in real time based on the user's consumption pattern of the media content of different media characteristics (e.g. genre, character, rating, locations, etc.) and corresponding time durations. In one embodiment, the system tracks the user's behavior (e.g. mood, activity, etc.) to determine a pattern of time duration of the user's consumption of the media content of each of different media characteristics. The system outputs media content on the user device and detects that the media content has media characteristic that is the same as the first media characteristic of first media content in the user's consumption pattern and has been consumed for the time duration. Based on the user's consumption pattern, the system determines that the user will very likely lose interest in the media content (or does not watch the media content) after the time duration and would want to watch a media content of a second media characteristic. The system then outputs a media content of a combined first and second media characteristics onto the user device followed by an output of media content of the second characteristics onto the user device. Thus, the embodiments of the present invention dynamically provide media content that is continuously being consumed by the user and also provides a smooth transition of the media content of different characteristics, which results in a pleasant viewing experience for the user. Also, with the auto-play in the ON mode, the user is continuously consuming a large quantity of media content provided to the user device resulting in highly efficient usage of both a large amount of processing power and the high bandwidth. Thus, the embodiments of the current invention ensure that these resources are not being wasted and are being utilized in real time.

In some embodiments of the present disclosure, the media content of the combined first and second characteristics includes first set of media frames of the first characteristics and a second set of the media frames of the second characteristics. In one embodiment, the system outputs the first set of media frames followed by the second set of media frames onto the user device. In another embodiment, the system outputs the second set of media frames followed by the first set of media frames.

In some embodiments of the present disclosure, the system retrieves from memory the media consumption pattern profile. The system identifies a media content item being output by a user device. The system detects that the media content item has the first media characteristic and has been output for the time duration onto the user device. The system generates a playlist manifest including another media content item having the first media characteristics and second media characteristics (different from the first media characteristics) and transmits the playlist manifest to the user device. After transmitting the playlist manifest, system transmits a different media content item having the second media characteristics to the user device.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 2A depicts an example of a graphical structure illustrating transition of characteristics of media content over a period of time, in accordance with some embodiments of the disclosure;

FIG. 2B depicts an example of a graphical structure illustrative media content recommendations during the transitions of the characteristics of media content over period of time, in accordance with some embodiments of the disclosure;

FIG. 2C depicts an example of a graphical structure representing recommendations of media content of combined genres over a period of time, in accordance with some embodiments of the disclosure;

DETAILED DESCRIPTION

Figure 1:
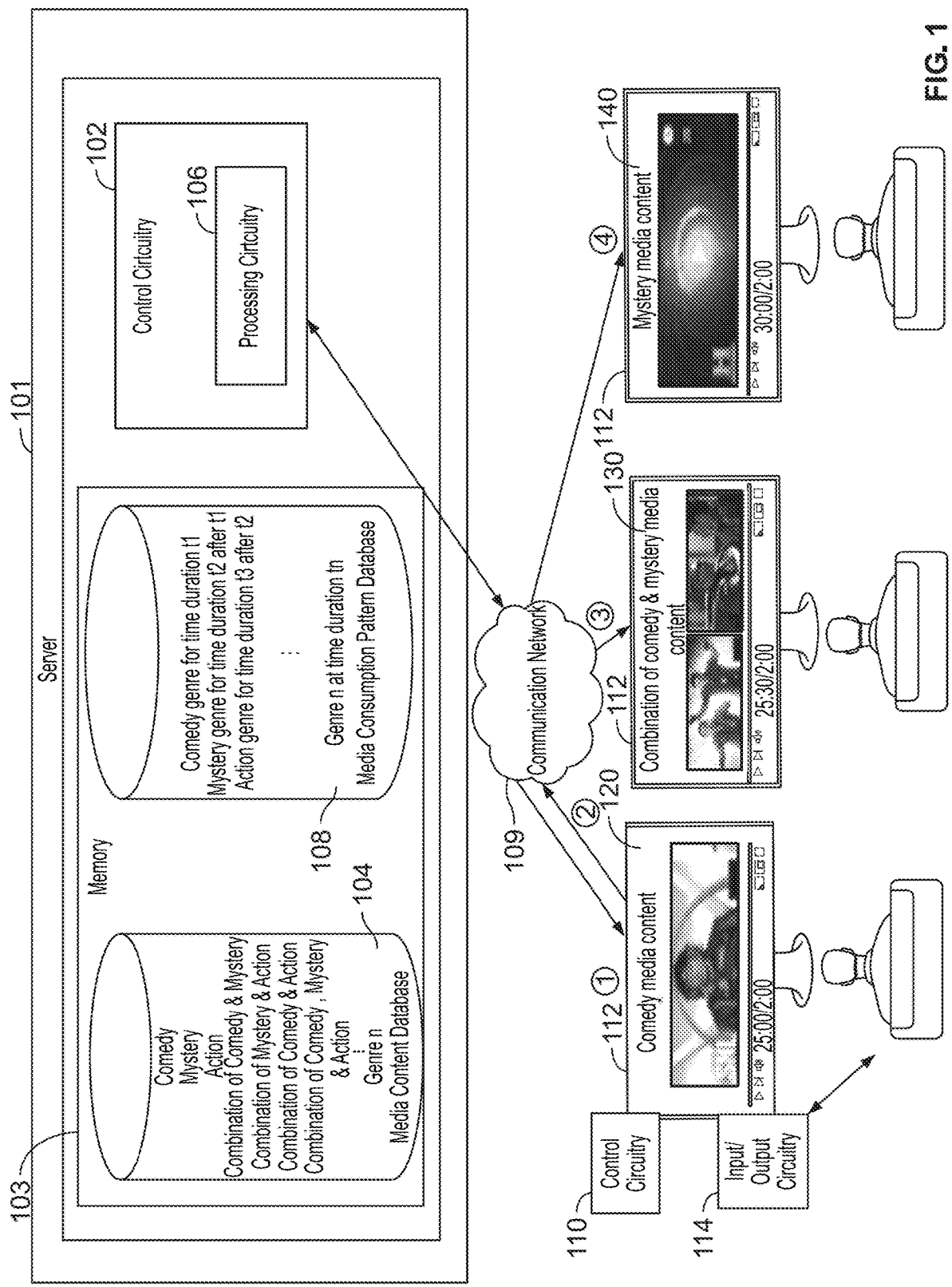
FIG. 1 depicts an illustrative example scenario for a scenario of a system for providing media content over a duration of time, in accordance with some embodiments of the disclosure.

FIG. 1 shows an example of a scenario 100 of a system providing media content items to one or more users, in accordance with some embodiments of this disclosure. Scenario 100 of FIG. 1 may include a server 101 (server 401 of FIG. 4) including a memory 103 and a control circuitry 102 (control circuitry 402 of FIG. 4). Scenario 100 may also include a user or computing device (device) 112 (computing device 460 of FIG. 4), which may be a smart phone, a smart television, a personal computer, a laptop computer, tablet, or any other type of computing device that displays and/or audio drivers, such as speakers (not shown in FIG. 1) that are respectively configured to visibly and/or audibly present content to one or more users. In one embodiment In some embodiments, the device 112 may include a control circuitry 110 (control circuitry 410 of FIG. 4) and an input/output (I/O) circuitry 114 (I/O circuitry 416 of FIG. 4). The device 112 may also include various graphical user interfaces (GUIs) 120, 130, 140, enabling users to interact with a media content item via the I/O circuitry 114. As referred to herein, the term "media content item" should be understood to mean an electronically consumable user content, such as television programming, as well as pay-per-view programs, on-demand programs (as in video-on-demand (VOD) systems), Internet content (e.g., streaming content, downloadable content, webcasts, etc.), videos, video clips, audio, playlists, websites, articles, electronic books, blogs, social media, applications, games, and/or any other media or multimedia, and/or combination of the same.

Figure 3:
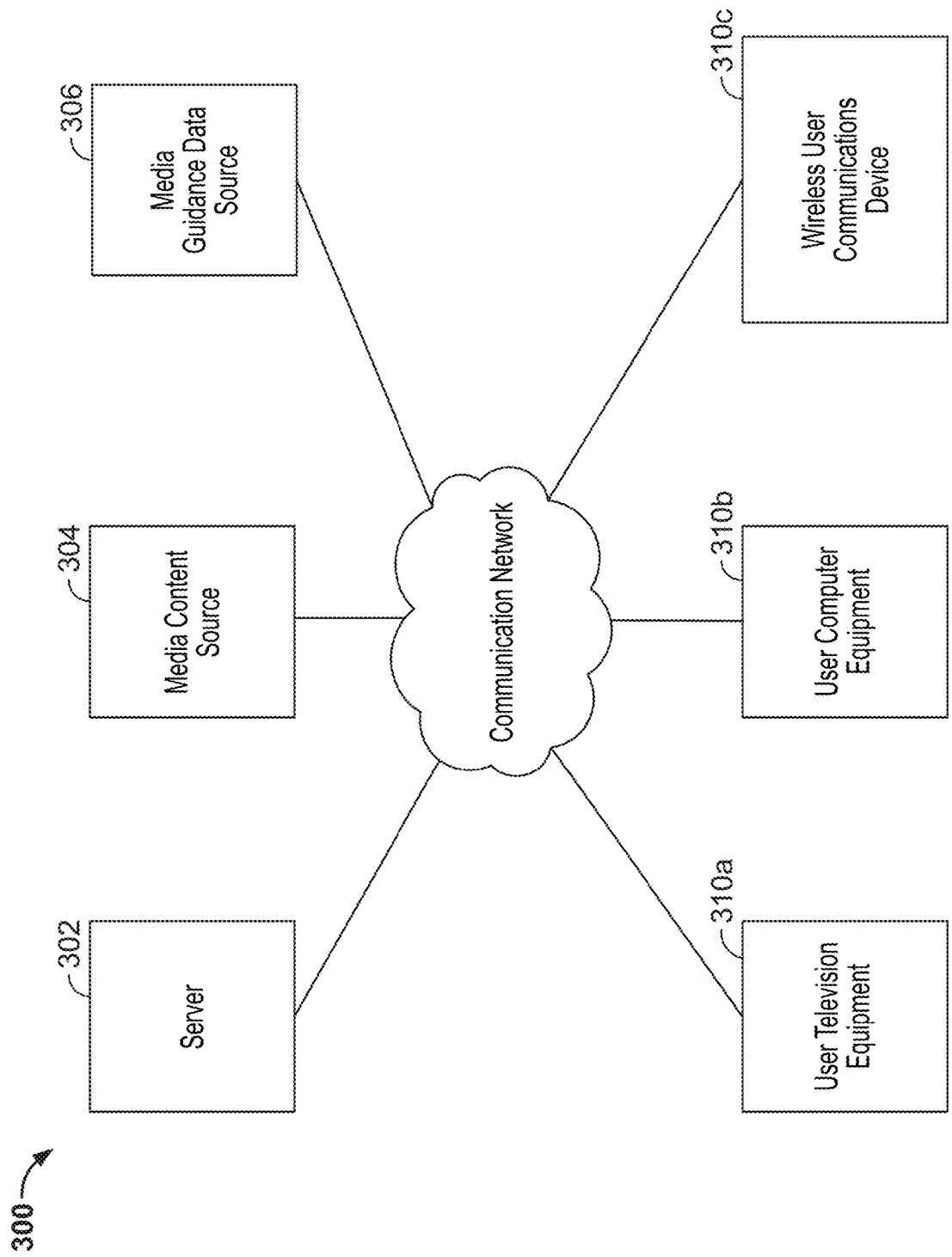
FIG. 3 shows an illustrative block diagram of a system hosting a content delivery application, in accordance with some embodiments of the disclosure, in accordance with some embodiments of the disclosure.

In some embodiments, memory 103 may include a media content database 104 a media consumption pattern database 104, which may be included in any of server 302, media content source 304, and/or media guidance data source 306 of FIG. 3. In one embodiment, the media content database 104 includes media content of various media characteristics (e.g. genre, character, rating, locations, etc.). As shown in FIG. 1, in one example, the media characteristics is a genre and the media content database 104 includes media content of comedy, mystery, action, combination of comedy & mystery, combination of mystery and action, combination of comedy and action genres.

In one embodiment, the media consumption pattern database 108 includes a media consumption pattern profile data generated by one of the control circuitry 102 or the control circuitry 114. The media consumption pattern profile data includes a plurality of media characteristics (e.g. genre, character, rating, locations, etc.) of a plurality of media content items as a pattern of media consumption and a time duration (t) indicating how long each media content item having the respective media characteristic was outputted for display on the computing device 114. As shown in FIG. 1, in one example, the media characteristics is a genre and the media consumption pattern database 108 includes a pattern of comedy genre of a time duration t1 followed by mystery genre of a time duration t2 followed by action genre at a time duration t3 followed by t2. In one embodiment, the media consumption pattern profile is generated based on user's behavior or activity associated with each of the media content items outputted for display on the computing device 114. Based on the user's behavior the control circuitry 102 and/or 110 determines whether user is interested in a currently displayed content item. As an example, when a first media content item is being displayed on the device 112, the control circuitry 102 and/or 110 accesses the media content database 104 and identifies the first media content item as the media content of a comedy genre. In one example, after some time, t1, user may start searching for another media content item on the device 112 via the I/O circuitry 114. At time t1, the control circuitry 102 and/or 110 determines that the user is no longer interested in the comedy genre media content item and detects the user switches to a second media content item after t1. The control circuitry 102 and/or 110 then accesses the media content database 104 and identifies the second media content item as a mystery genre. In one example, after some time, t2, user may start searching for another media content item on the device 112 via the I/O circuitry 114. Then, after t2, the user switches to a third media content item. The control circuitry 102 and/or 110 accesses the media content database 104 and identifies that the second media content item is of a mystery genre. The control circuitry 102 and/or 110 also detects that the user watched the mystery genre content item for time t3 before searching or switching to another media content item. Even though, the example described above is based on user's activity on the user device such as searching or switching to different media content items, other user's activity or behavior may be user appears bored or falls asleep while watching currently displayed media content item after the time t or the user stopped watching the currently displayed media content item the after time t.

In one embodiment, the control circuitry 102 and/or 110 determines a media characteristics strength score of each of the plurality of media characteristics during each of the time duration (t) of the respective media content item and generates the media consumption pattern profile. FIG. 2A illustrates an example of a graph structure 200 representing media consumption pattern profile data including a pattern of transition of genres of media content items in a previous viewing session. In one example, y-axis shows a genre strength score 202 of the genre of the media content and y-axis shows the time duration t 204 during the previous viewing session. As discussed above, user's behavior or activity is tracked to determine the genre of the media content items and the time (t) during which each of the media content items was consumed by the user. In one embodiment, genre strength is determined by tracking user's past behavior or activity towards each of the media content items of respective genres during the time t. For example, the graph 200 illustrates the genre strength scores 202 of three genres, comedy 206, mystery 208 and action 210 during the time duration t of a previous viewing session. In one example, comedy genre strength is high and mystery genre strength is low during the time t1 of the t of the previous viewing session. After t1, it is determined that the user's mood has changed and is starting to lose interest in the media content with the comedy genre and begins to take interest in the media content with mystery genre, which results in a transition of media content such that user begins to watch only mystery genre starting at beginning of time duration time t2. Starting at the t2, the comedy genre strength begins to decrease and mystery genre strength begins to increase. During time t2 the mystery genre strength is high and comedy genre strength is low indicating that that the user is watching the media content of only mystery genre. After t2, it is determined that the user's mood has changed again and is starting to lose interest in the mystery genre and begins to take interest in the action genre, which results in transition of the media content such that the user begins to watch action only genre content starting at beginning of time duration t3. Starting at the t3, the mystery genre strength begins to decrease and action genre strength begins to increase. During time t3 the action genre strength is high and mystery genre strength is low indicating that that the user is watching the media content of only action genre.

In one embodiment, the pattern consumption profile data in the graph structure 2A is updated based on tracking user's behavior or activity towards the media content items during a current viewing session. For example, during the current viewing session, it is determined that the time duration t1 is longer or shorter than stored in the user consumption profile. Then, t1 is updated based on the time duration of user consuming the media content of comedy genre during the current viewing session. In another example, during the current viewing session, it is determined that the after t1, user switches to a media content item of a drama genre. Then, mystery genre strength is replaced with drama genre strength based on user switching from the comedy genre media content to the drama genre media content.

As discussed above, the user behavior is tracked based on user's behavior or activity. Some examples of user's behavior or activity includes user input such as user switching media content from one genre to another, prior search queries by the user, prior user interactions with media content, like or dislike of the media content, positive or negative comments on the media content, shares and/or number of shares of the media content, blogs or discussion related to the media content, other social media interactions by the user related to media content etc. In some embodiments, the user behavior or activity may be determined based on user's mood or emotions such as happy, sad, bored, furious etc. detected. Such moods or emotions may be detected based on facial expressions captured via an sensor (not shown), such as camera or based on pulse and/or heart rate detected via a smartwatch (not shown) worn by the user. In some embodiments, user behavior or activity may be determined based on user's daily schedule. In example, the system determines that the user watches comedy genre media content before dinner time (i.e. comedy genre strength is high and mystery genre strength is low) and does not watch any media content during dinner time (i.e. both comedy and mystery genre strength is low) and watches mystery genre media content after dinner time (i.e. mystery genre strength is high and comedy genre strength is low). The system may generate the user consumption pattern profile data such that the comedy genre media content is provided to the user before dinner time and mystery genre media content is provided to the user after dinner time. In one example, no media content is provided to the user during dinner time. In another example, an advertisement/commercial is provided to the user during dinner time.

FIG. 2B illustrates an example of a graph structure 220, generated by the control circuitry 102 and/or 110 to represent recommendation of media content of different genres. In one example, during the time duration t1, the genre strength of the comedy genre is high, the control circuitry 102 and/or 110 functions to recommend comedy genre media content. In one example, video clip (s) of the comedy media content recommended is a show "Saturday Night Live." In one embodiment, during time duration between t1 and t2 indicating transition of the decrease of the genre strength of the comedy media content and the increase of the genre strength of the mystery media content, the control circuitry 102 and/or 110 functions to recommend media content with a combined comedy and mystery genre. In one example, video clip(s) of the media content with combined comedy and mystery genre recommended is a movie "21 Jump street." comedy media content. In one embodiment, during the time duration t2, genre strength of the mystery media content is high, the control circuitry 102 and/or 110 functions to recommend mystery media content. In one example, video clip (s) of the mystery media content recommended is a movie "The Harrow."

FIG. 2C illustrates an example of a graph structures 230 and 232, generated by the control circuitry 102 and/or 110 to represent recommendation of media content of combined comedy and mystery genre during the time duration between t1 and t2. The combined comedy and mystery genre media content of sets of media frames. In one example, the first set of media frames include video clip(s) are of comedy genre and a second set of video frames include video clip(s) are of a mystery genre. In one example, the control circuitry 102 and/or 110 determines that the media content of comedy genre was displayed onto the user device during the time t1. The control circuitry 102 and/or 110 selects to output the first set of media frames of comedy genre for display followed by outputting the second set of media frames of mystery genre for display onto the user device during the time duration between t1 and t2 as shown in the graph structure 230. In another example, the control circuitry 102 and/or 110 determines that the media content of mystery genre was displayed onto the user device during the time t1. The control circuitry 102 and/or 110 functions to output the second set of media frames of mystery genre for display followed by outputting the first set of media frames of mystery genre for display onto the user device during the time duration between t1 and t2 as shown in the graph structure 232.

Returning back to FIG. 1, in one example, the control circuitry 102 and/or 110 accesses the media content database 104 and functions to output a media content to be displayed on the GUI 120 of the device 112, which is currently being viewed by the user 114. In one embodiment, the control circuitry 102 and/or 110 determines that the media content on the GUI 120 is of a comedy genre and determines that it matches with the comedy genre in the media consumption pattern database 104. In one example as shown, current viewing session for the user is two hours. In one embodiment, the control circuitry 102 and/or 110 detects that the user 114 is watching the media content of comedy genre (comedy media content) for an approximate time of 25 minutes. In one embodiment, the control circuitry 102 and/or 110 compares the comedy genre of the approximate time of 25 minutes with the time duration t1 corresponding to the comedy genre in the media consumption pattern database 104 and determines a match. In one embodiment, control circuitry 102 and/or 110 predicts from the media consumption pattern database 104 that after t1, the user 114 will switch from watching comedy media content to media content of mystery genre (mystery media content) beginning at the time duration t2. The control circuitry 102 and/or 110 selects a combination of comedy and mystery genre media content from the media content database 104 to output for display onto the device 112 as shown on the GUI 130 after approximate time of 25 minutes. Thus, the control circuitry 102 and/or 110 automatically switches to display from comedy media content to the combination of comedy and mystery genre media content after time t1 but before time t2. As an example, the combination of comedy and mystery media content on the GUI 130 is shown beginning at approximately 25 minutes 30 seconds. In one embodiment, the control circuitry 102 and/110 outputs the combined comedy and mystery media content for display during the time t1 and t2. In one example, video clip of comedy genre of the combined comedy and mystery media content is outputted to be displayed first, which is followed by the video clip of mystery genre of the combined comedy and mystery media content. In another example, video clip of mystery genre of the combined comedy and mystery media content is outputted to be displayed first, which is followed by the video clip of comedy genre of the combined comedy and mystery media content. In one embodiment, the control circuitry 102 and/110 detects that the time t2 begins at approximately 30 minutes into the current viewing session. The control circuitry 102 and/or 110 selects the mystery media content from the media content database 104 to output for display onto the device 112 as shown on the GUI 140 at approximate 30 minutes into the current viewing session. Thus, the control circuitry 102 and/or 110 automatically switches the display on the GUI 140 from combined comedy and mystery media content to mystery media content beginning at approximately 30 minutes into the current viewing session. Thus, in one embodiment, the control circuitry 102 and/or 110 functions to predict and/or detect when to switch the media content item in real time.

FIG. 3 shows an illustrative block diagram of a system 300 for displaying content, in accordance with some embodiments of the disclosure. In various aspects, system 300 includes one or more of server 302, media content source 304, media guidance data source 306, communication network 308, and one or more computing devices or user equipment 310, e.g., user television equipment 310a (e.g., a set-top box), user computer equipment 310b (e.g., a desktop or laptop), and/or wireless user communications device 310c (e.g., a smartphone device or tablet). The computing device or user equipment 310 may correspond to computing device 102 in FIG. 1 and may include one or more sensors or devices (e.g., a camera, a microphone, eye scanner, fingerprint scanner, remote control, etc.) to collect biometric data of users. Although FIG. 3 shows one of each component, in various examples, system 300 may include fewer than the illustrated components, multiples of one or more illustrated components, and/or additional components. Communication network 308 may be any type of communication network, e.g., the Internet, a mobile phone network, mobile voice or data network (e.g., a 4G or LTE network), cable network, public switched telephone network, or any combination of two or more of such communication networks. Communication network 308 includes one or more communication paths, such as a satellite path, a fiber-optic path, a cable path, a path that supports Internet communications (e.g., IP TV), free-space connections (e.g., for broadcast or other wireless signals), or any other suitable wired or wireless communication path or combination of such paths. Communication network 308 communicatively couples various components of system 300 to one another. For instance, server 302 may be communicatively coupled to media content source 304, media guidance data source 306, and/or computing device 310 via communication network 308.

In some examples, media content source 304 and media guidance data source 306 may be integrated as one device. Media content source 304 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 304 may be the originator of content (e.g., a television broadcaster, a Webcast provider, etc.) or may not be the originator of content (e.g., an on-demand content provider, an Internet provider of content of broadcast programs for downloading, etc.). Media content source 304 may include cable sources, satellite providers, on-demand providers, Internet providers, over-the-top content providers, or other providers of content. Media content source 304 may also include a remote media server used to store different types of content (e.g., including video content selected by a user) in a location remote from computing device 310. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 304 and media guidance data source 306 may provide content and/or media guidance data to computing device 310 and/or server 302 using any suitable approach. In some embodiments, media guidance data source 306 may provide a stand-alone interactive television program guide that receives program guide data via a data feed (e.g., a continuous feed or trickle feed). In some examples, media guidance data source 306 may provide program schedule data and other guidance data to computing device 310 on a television channel sideband, using an in-band digital signal, an out-of-band digital signal, or any other suitable data transmission technique.

As described in further detail below, server 302 may manage the communication of a live content stream (e.g., a live sporting event broadcast, a live news broadcast, or the like) and recorded streams from media content source 304 to computing device 310 via communication network 308. For instance, in some embodiments, content from media content source 304 and/or guidance data from media guidance data source 306 may be provided to computing device 310 using a client/server approach. In such examples, computing device 310 may pull content and/or media guidance data from server 302 and/or server 302 may push content and/or media guidance data to computing device 310. In some embodiments, a client application residing on computing device 310 may initiate sessions with server 302, media content source 304, and/or media guidance data source 306 to obtain content and/or guidance data when needed, e.g., when the guidance data is out of date or when computing device 310 receives a request from the user to receive content or guidance data. In various aspects, server 302 may also be configured to detect events within the live content stream and, based on the detected events, control the display of content and/or navigation menu options via computing device 310. Additionally, although FIG. 3 shows media content source 304 and media guidance data source 306 as separate from server 302, in some embodiments, media content source 304 and/or media guidance data source 306 may be integrated as one device with server 302.

Content and/or media guidance data delivered to computing device 310 may be over-the-top (OTT) content. OTT content delivery allows Internet-enabled user devices, such as computing device 310, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 310.

Figure 4:
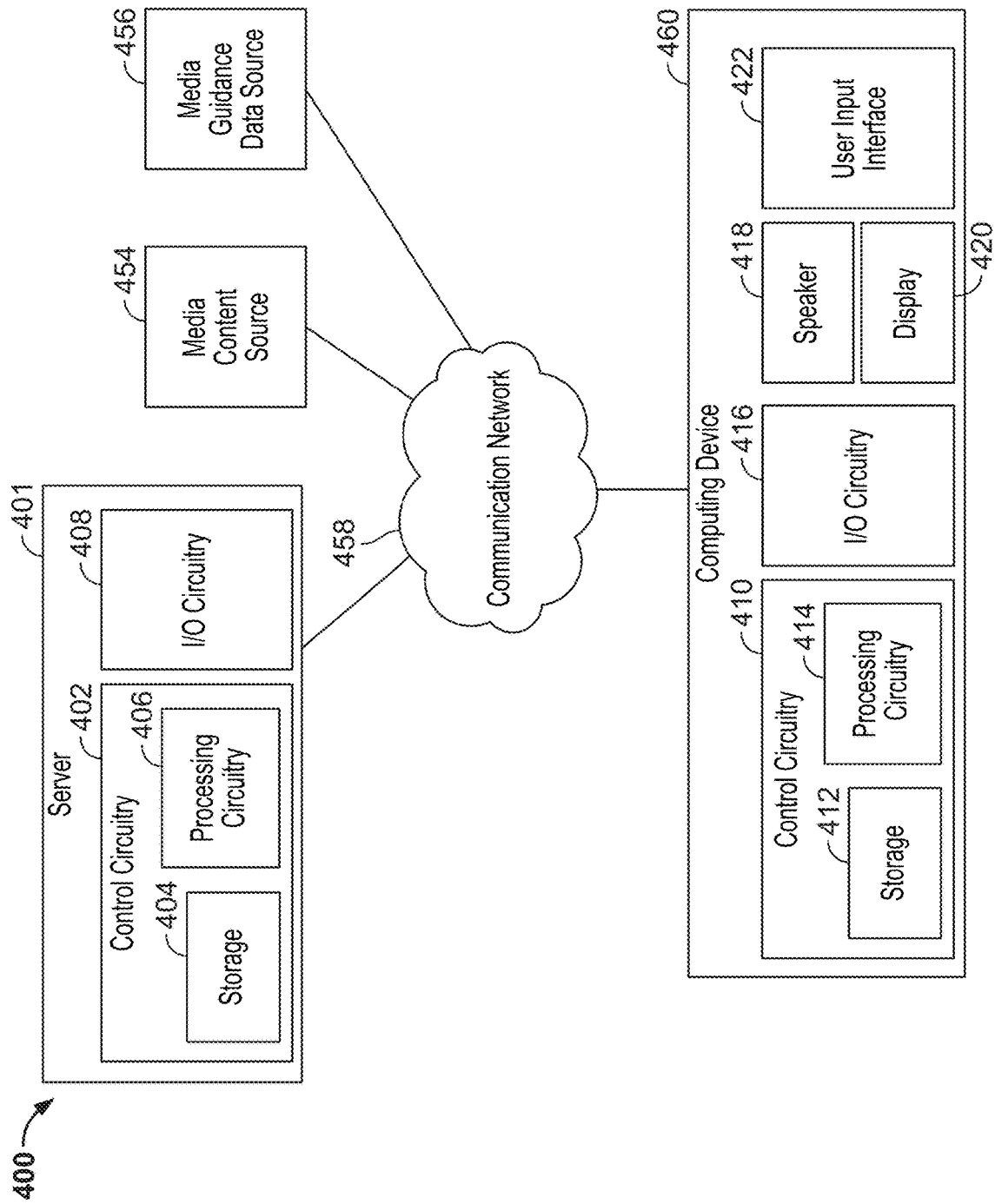
FIG. 4 is an illustrative block diagram showing additional details of a system hosting the content delivery application, in accordance with some embodiments of the disclosure, in accordance with some embodiments of the disclosure.

FIG. 4 is an illustrative block diagram showing additional details of the system 400 (which may be the same as system 300 of FIG. 3), in accordance with some embodiments of the disclosure. In particular, server 401 (e.g., the same server as server 302) includes control circuitry 402 and I/O circuitry 408, and control circuitry 402 includes storage 404 and processing circuitry 406. Computing device 460 (e.g., one or more of devices 310a, 310, and 310c) includes control circuitry 410, I/O circuitry 416, speaker 418, display 420 (as well circuitry for generating images for display on display 420), and user input interface 422. Control circuitry 410 includes storage 412 and processing circuitry 414. Control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 404, storage 412, and/or storages of other components of system 300 (e.g., storages of media content source 454, media guidance data source 456, and/or the like) may be an electronic storage device. In some embodiments, media content source 454 may be the same as media content source 304. In some embodiments, media guidance data source 456 may be the same as media content source 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 404, storage 412, and/or storages of other components of system 400 may be used to store various types of content, media guidance data, and or other types of data. Non-volatile memory may also be used (e.g., to launch a boot-up routine and other instructions). Cloud-based storage may be used to supplement storages 404, 412 or instead of storages 404, 412. In some embodiments, control circuitry 402 and/or 410 executes instructions for a media content application stored in memory (e.g., storage 404 and/or 412). Specifically, control circuitry 402 and/or 410 may be instructed by the media content application to perform the functions discussed herein. In some implementations, any action performed by control circuitry 402 and/or 410 may be based on instructions received from the media content application. For example, the media content application may be implemented as software or a set of executable instructions that may be stored in storage 404 and/or 312 and executed by control circuitry 402 and/or 410. In some embodiments, the media content application may be a client/server media content r application where only a client content application resides on computing device 460, and a server content application resides on server 401.

The media content application may be implemented using any suitable architecture. For example, it may be a stand-alone content application wholly implemented on computing device 460. In such an approach, instructions for the media content application are stored locally (e.g., in storage 412), and data for use by the media content application is downloaded on a periodic basis (e.g., from an out-of-band feed, from an Internet resource, or using another suitable approach). Control circuitry 410 may retrieve instructions for the media content application from storage 412 and process the instructions to perform the functionality described herein. Based on the processed instructions, control circuitry 410 may determine what action to perform when input is received from user input interface 422.

In client/server-based embodiments, control circuitry 410 may include communication circuitry suitable for communicating with a content application server (e.g., server 401) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 458). In some embodiments, communication network 458 may be the same as network 308. In another example of a client/server-based application, control circuitry 410 runs a web browser that interprets web pages provided by a remote server (e.g., server 401). For example, the remote server may store the instructions for the application in a storage device. The remote server may process the stored instructions using circuitry (e.g., control circuitry 402) and generate the displays discussed above and below. Computing device 460 may receive the displays generated by the remote server and may display the content of the displays locally via display 420. This way, the processing of the instructions is performed remotely (e.g., by server 401) while the resulting displays, such as the display windows described elsewhere herein, are provided locally on computing device 460. For example, computing device 460 may include display circuitry (e.g., video card circuitry or combination motherboard and video card circuitry) configured to generate for display the display windows. Computing device 460 may receive inputs from the user via input interface 422 and transmit those inputs to the remote server for processing and generating the corresponding displays.

A user may send instructions to control circuitry 402 and/or 410 using user input interface 422. User input interface 422 may be any suitable user interface, such as a remote control, trackball, keypad, keyboard, touchscreen, touchpad, stylus input, joystick, voice recognition interface, or other user input interfaces. User input interface 422 may be integrated with or combined with display 420, which may be a monitor, television, liquid crystal display (LCD), electronic ink display, or any other equipment suitable for displaying visual images.

Server 401 and computing device 460 may receive content and data via input/output (hereinafter "I/O") circuitries 408 and 416, respectively. For instance, I/O circuitry 416 may include circuitry that includes one or more of communication port configured to receive a live content stream from server 401 and/or media content source 454 via a communication network 458. Storage 412 may be configured to buffer the received live content stream for playback, and display 420 may be configured to present the buffered content, navigation options, alerts, and/or the like via a primary display window and/or a secondary display window. I/O circuitries 408, 416 may provide content (e.g., a live stream of content, broadcast programming, on-demand programming, Internet content, content available over a local area network (LAN) or wide area network (WAN), and/or other content) and data to control circuitry 402, 410. Control circuitry 402, 410 may be used to send and receive commands, requests, and other suitable data using I/O circuitries 408, 416. I/O circuitries 408, 416 may connect control circuitry 402, 410 (and specifically processing circuitry 406, 414) to one or more communication paths (described below). I/O functions may be provided by one or more of these communication paths but are shown as single paths in FIG. 4 to avoid overcomplicating the drawing.

Figure 5:
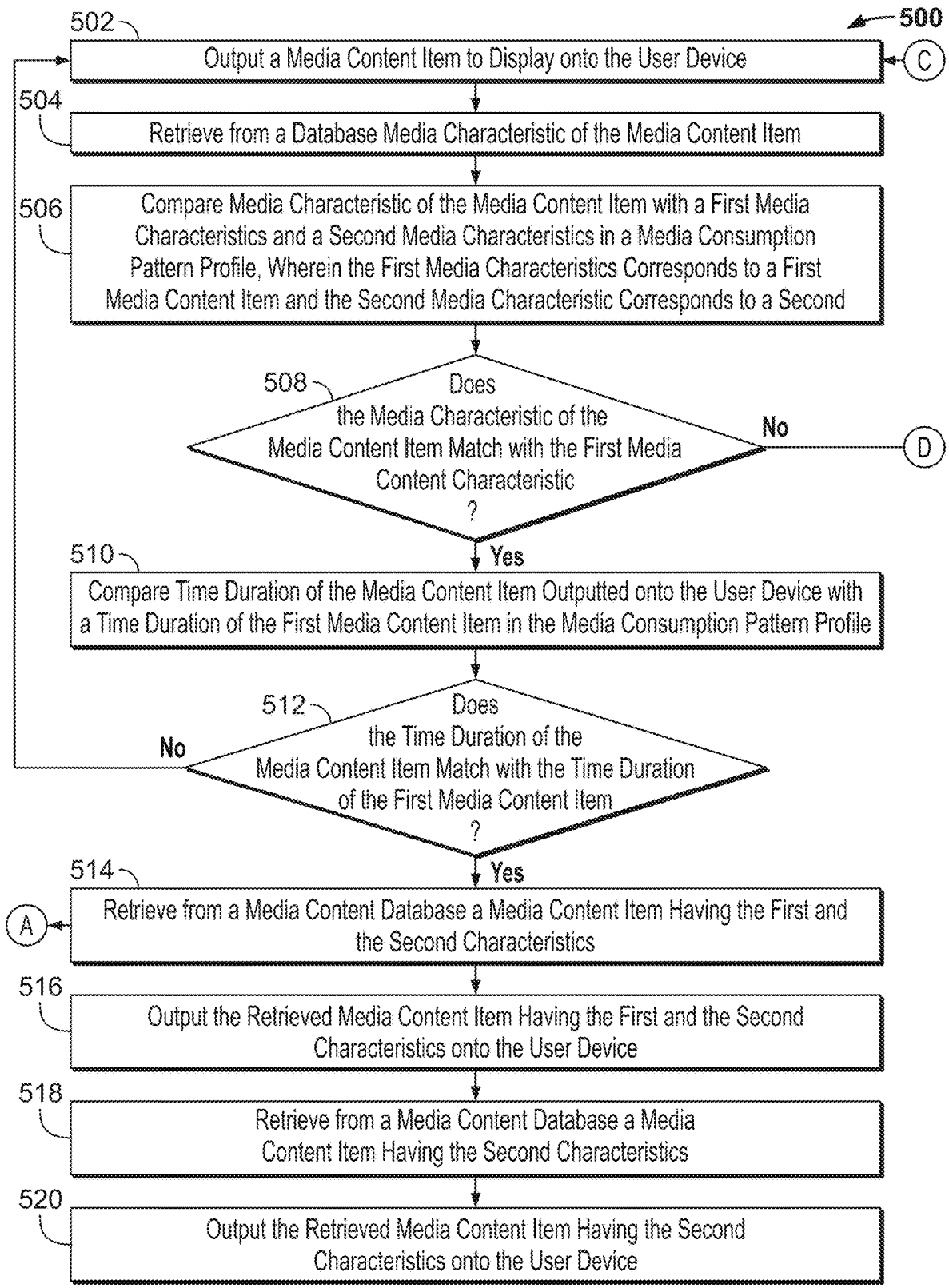
FIG. 5 is a flow chart a method for providing media content over a period of time, in accordance with some embodiments of the disclosure.
Figure 5:
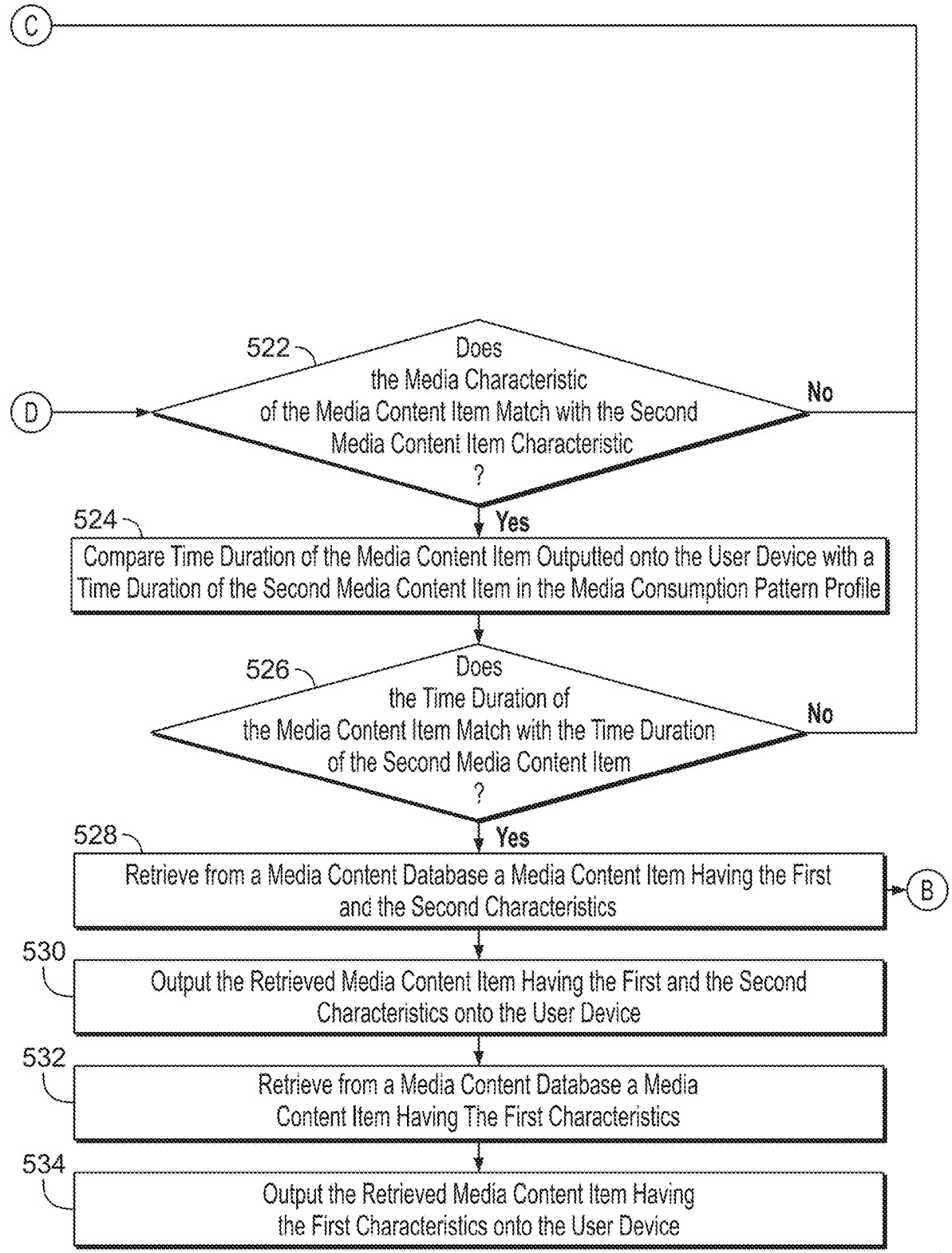

Having described systems 300 and 400, reference is now made to FIG. 5, which depicts an illustrative flowchart of process 500 for providing media content that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 502, control circuitry 410 outputs a media content item to display onto the user device. At 504, control circuitry 402 retrieves from a database media characteristic of the media content item. At 506, control circuitry 402 compares media characteristic of the media content item with a first media characteristics and a second media characteristics in a media consumption pattern profile, wherein the first media characteristics corresponds to a first media content item and the second media characteristic corresponds to a second media content item. At 508, control circuitry 402 determines whether the media characteristic of the media content item match with the first media content characteristic. When at 508, it is determined that the media characteristic of the media content item does match with the first media content characteristic, then at 510, control circuitry 402 compares time duration of the media content item outputted onto the user device with a time duration of the first media content item in the media consumption pattern profile. At 512, control circuitry 402 determines whether the time duration of the media content item match with the time duration of the first media content item. When at 512, it is determined that the time duration of the media content item does not match with the time duration of the first media content item, then then control circuitry 410 continues to output the media content item to display onto the user device at 502. When at 512, it is determined that the time duration of the media content item does match with the time duration of the first media content item, then at 514, control circuitry 402 retrieves from a media content database a media content item having the first and the second characteristics. At 516, control circuitry 410 outputs the retrieved media content item having the first and the second characteristics onto the user device. In one embodiment, the control circuitry 402 transmits the retrieved media content item to the control circuitry 410. At 518, control circuitry 402 retrieves from a media content database a media content item having the second characteristics. At step 520, control circuitry 410 outputs the retrieved media content item having the second characteristics onto the user device.

Returning back at 508, when it is determined that the media characteristic of the media content item does not match with the first media content characteristic, then at 522, control circuitry 402 determines whether media characteristic of the media content item match with the second media content characteristic. When at 522, it is determined that the media characteristic of the media content item does not match with the second media content characteristic, then control circuitry 410 continues to output the media content item to display onto the user device at 502. When at 522, it is determined that the media characteristic of the media content item does match with the second media content characteristic, then at 524, control circuitry 402 compares time duration of the media content item outputted onto the user device with a time duration of the second media content item in the media consumption pattern profile. At 526, it is determined whether the time duration of the media content item match with the time duration of the second media content item. When at 526, it is determined that the time duration of the media content item does not match with the time duration of the second media content item, then then control circuitry 410 continues to output the media content item to display onto the user device at 502. When at 526, it is determined that the time duration of the media content item does match with the time duration of the second media content item, then then at 528 control circuitry 402 retrieves from a media content database a media content item having the first and the second characteristics. At 530, control circuitry 410 outputs the retrieved media content item having the first and the second characteristics onto the user device. In one embodiment, the control circuitry 402 transmits the retrieved media content item to the control circuitry 410. At 532, control circuitry 402 retrieves from a media content database a media content item having the first characteristics. At 534, control circuitry 410 outputs the retrieved media content item having the first characteristics onto the user device.

Figure 6:
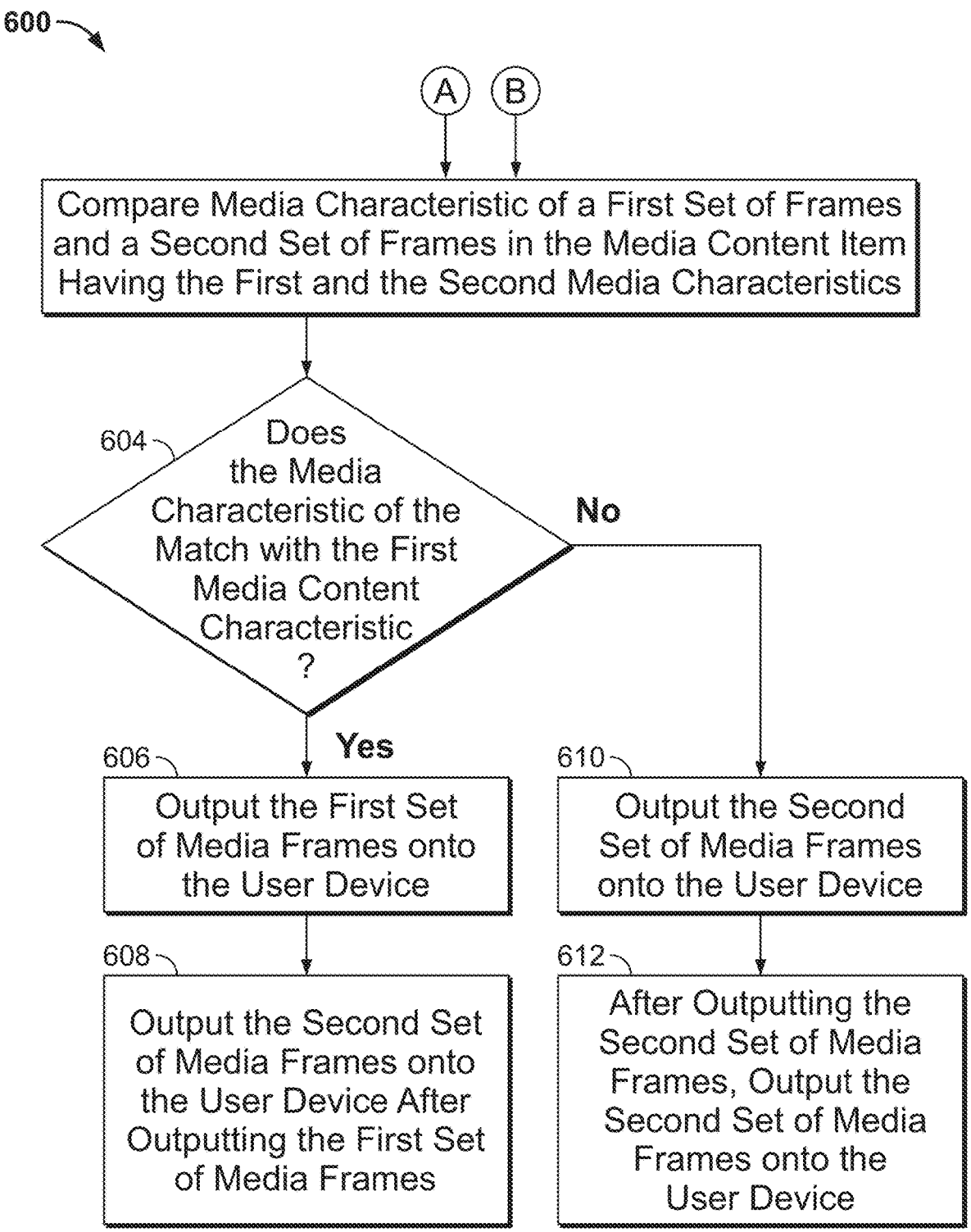
FIG. 6 is a flow chart of a method for providing media content having combination of characteristics, in accordance with some embodiments of the disclosure.

FIG. 6 depicts an illustrative flowchart of process 600 for providing media content having combination of characteristics that may be implemented by using systems 300 and 400, in accordance with some embodiments of the disclosure. In various embodiments, individual steps of process 600 may be implemented by one or more components of systems 300 and 400. Although the present disclosure may describe certain steps of process 600 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 602, control circuitry 410 compares media characteristic of a first set of frames and a second set of frames in the media content item having the first and the second media characteristics. In one embodiment, the media content item having the first and the second media characteristics is stored in the media content database 104. At 604, control circuitry 410 determines whether the media characteristic of the first set of frames match with the first media content characteristic. When at 604, it is determined that media characteristic of the first set of frames match with the first media content characteristic, then at 606, the control circuitry 410 outputs the first set of media frames onto the user device. At step 608, the control circuitry 410 outputs the second set of media frames onto the user device after outputting the first set of media frames. When at 604, it is determined that media characteristic of the first set of frames does not match with the first media content characteristic, then at 610, the control circuitry 410 outputs the second set of media frames onto the user device. At step 612, the control circuitry 410 outputs the first set of media frames onto the user device after outputting the first set of media frame.

Figure 7:
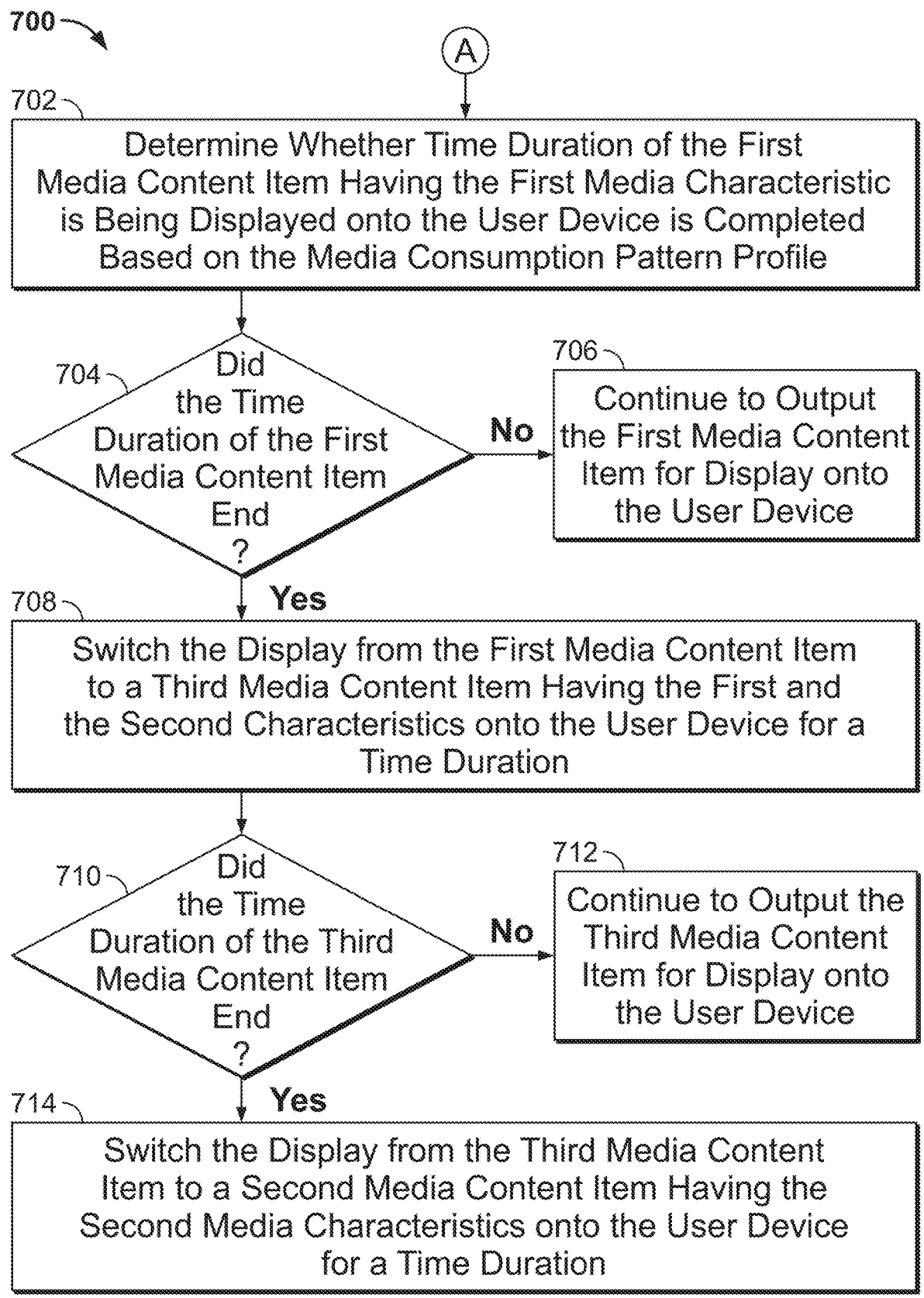
FIG. 7 depicts an illustrative flowchart of process for switching media content of various characteristics in accordance with some embodiments of the disclosure.

FIG. 7 depicts an illustrative flowchart of process 700 for switching media content of various characteristics that may be implemented by using systems 300 and 400, in accordance with some embodiments of the disclosure. In various embodiments, individual steps of process 700 may be implemented by one or more components of systems 300 and 400. Although the present disclosure may describe certain steps of process 600 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 702, control circuitry 410 determines whether the time duration of the first media content item having the first media characteristic being displayed onto the user device is completed based on the media consumption pattern profile. In one example, the time duration corresponding to the first media characteristic is t1 in the media consumption pattern database. At 704, it is determined whether the time duration of the first media content item has ended. When at 704, it is determined that the time duration of the first media content item has not ended, then at 706, the control circuitry 410 continues to output the first media content item for display onto the user device. When at 704, it is determined that the time duration of the first media content item has ended, then at 708, the control circuitry 410 switches the display from the first media content item to a third media content item having the first and the second characteristics onto the user device for a time duration. At 710, it is determined whether the time duration of the third media content item has ended. When at 710, it is determined that the time duration of the third media content item has not ended, then at 712, the control circuitry 410 continues to output the third media content item for display onto the user device. When at 710, it is determined that the time duration of the third media content item has ended, then at 714, the control circuitry 410 switches the display from the third media content item to a second media content item having the second characteristic onto the user device for a time duration.

Figure 8:
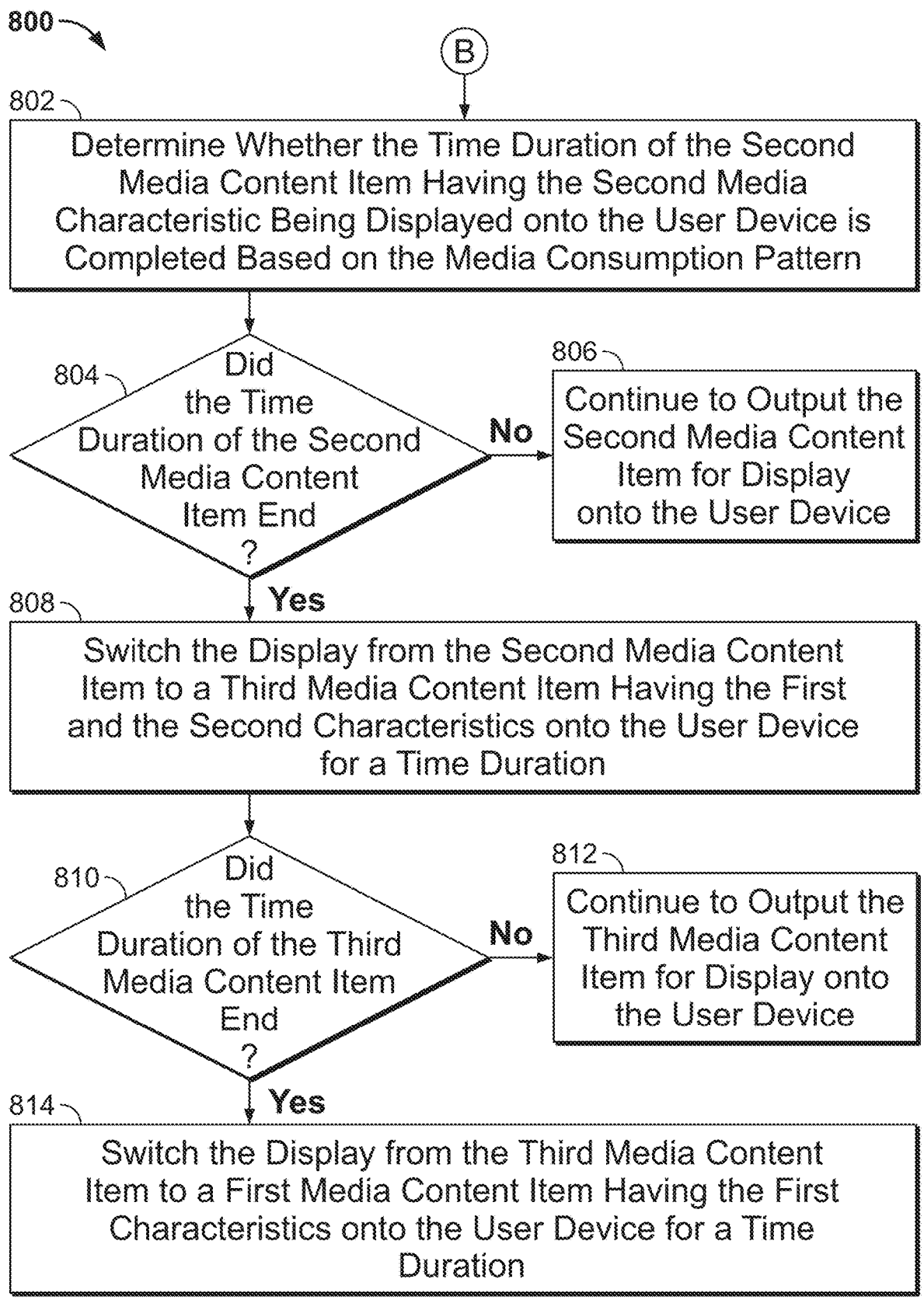
FIG. 8 depicts an illustrative flowchart of process for switching media content of various characteristics in accordance with some embodiments of the disclosure.

FIG. 8 depicts an illustrative flowchart of process 800 for switching media content of various characteristics that may be implemented by using systems 300 and 400, in accordance with some embodiments of the disclosure. In various embodiments, individual steps of process 800 may be implemented by one or more components of systems 300 and 400. Although the present disclosure may describe certain steps of process 800 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 802, control circuitry 410 determines whether the time duration of the second media content item having the second media characteristic being displayed onto the user device is completed based on the media consumption pattern profile. In one example, the time duration corresponding to the second media characteristic is t2 in the media consumption pattern database. At 804, it is determined whether the time duration of the second media content item has ended. When at 804, it is determined that the time duration of the second media content item has not ended, then at 806, the control circuitry 410 continues to output the second media content item for display onto the user device. When at 804, it is determined that the time duration of the second media content item has ended, then at 808, the control circuitry 410 switches the display from the second media content item to a third media content item having the first and the second characteristics onto the user device for a time duration. At 810, it is determined whether the time duration of the third media content item has ended. When at 810, it is determined that the time duration of the third media content item has not ended, then at 812, the control circuitry 410 continues to output the third media content item for display onto the user device. When at 810, it is determined that the time duration of the third media content item has ended, then at 814, the control circuitry 410 switches the display from the third media content item to a first media content item having the first characteristic onto the user device for a time duration.

Figure 9:
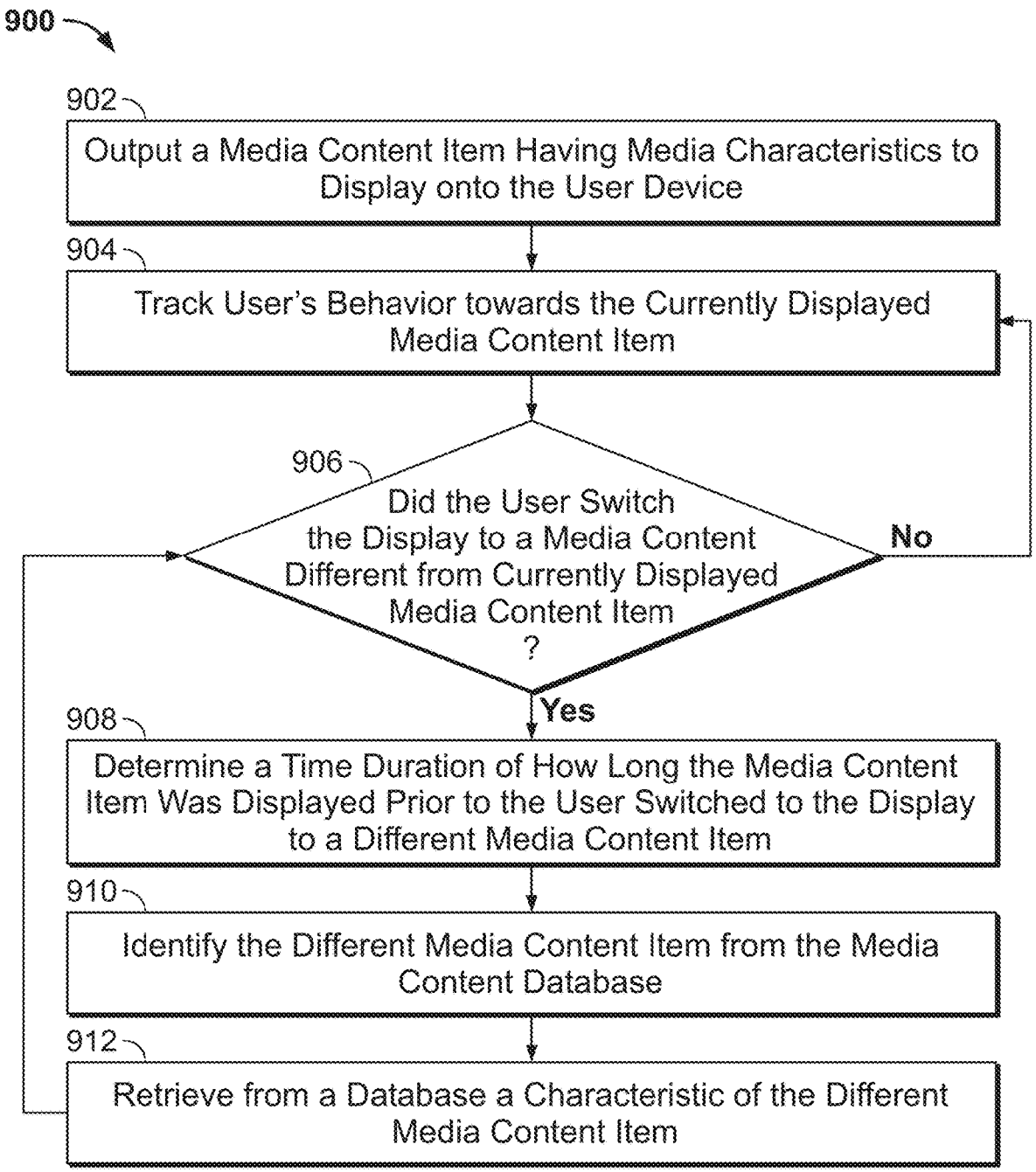
FIG. 9 depicts an illustrative flowchart of process for generating media consumption pattern profile; in accordance with some embodiments of the disclosure.

FIG. 9 depicts an illustrative flowchart of process 900 for generating media consumption pattern profile that may be implemented by using systems 300 and 400, in accordance with some embodiments of the disclosure. In various embodiments, individual steps of process 800 may be implemented by one or more components of systems 300 and 400. Although the present disclosure may describe certain steps of process 900 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 902, control circuitry 410 outputs a media content item having media characteristics to display onto the user device. At 904, control circuitry 410 tracks user's behavior towards the currently displayed media content item. At 906, it is determined whether the user switched the display to a media content different from currently displayed media content item. When at 906, it is determined that the user did not switch the display to a different media content, control circuitry 410 continues to track the user's behavior at 904. When at 906, it is determined that the user did switch the display to a different media content, at 908, control circuitry 410 determines a time duration of how long the media content item was displayed prior to the user switched to the display to a different media content item. At 910, control circuitry 410 identifies the different media content item from the media content database. At 912, control circuitry 410 retrieves from a database a characteristic of the different media content item and continues to determine whether the user switch the display at 906.

Figure 10:
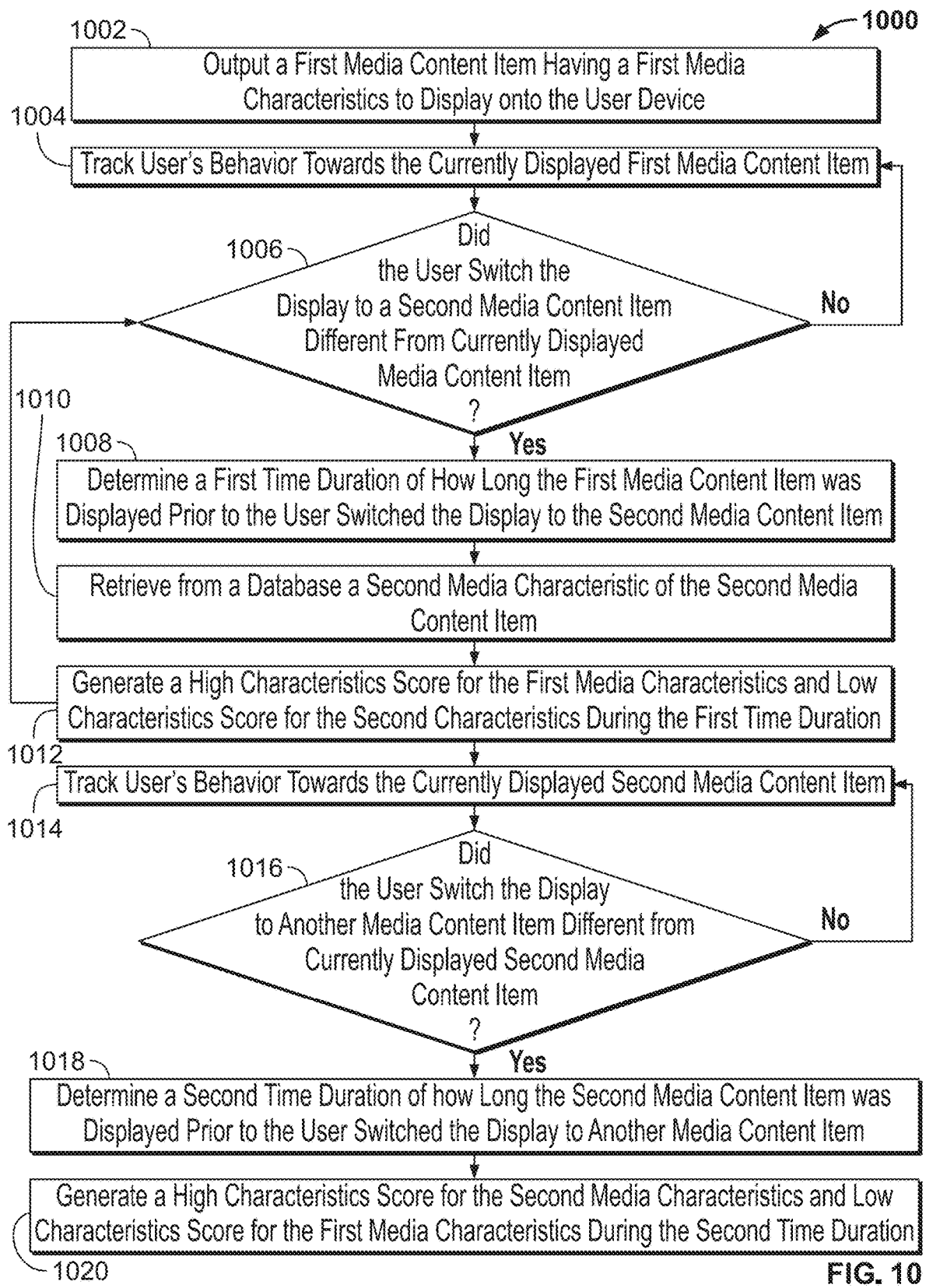
FIG. 10 depicts an illustrative flowchart of process for generating media consumption pattern profile in accordance with some embodiments of the disclosure.

FIG. 10 depicts an illustrative flowchart of process 1000 for generating media consumption pattern profile that may be implemented by using systems 300 and 400, in accordance with some embodiments of the disclosure. In various embodiments, individual steps of process 1000 may be implemented by one or more components of systems 300 and 400. Although the present disclosure may describe certain steps of process 900 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide media content.

At 1002, control circuitry 410 outputs a media content item having a first media characteristics to display onto the user device. At 1004, control circuitry 410 tracks user's behavior towards the currently displayed first media content item. At 1006, it is determined whether the user switched the display to a second media content item different from currently displayed media content item. When at 1006, it is determined that the user did not switch the display, then control circuitry 410 continues to track the user's behavior at 1004. When at 1006, it is determined that the user did not switch the display, then at 1008, control circuitry 410 determines a first time duration of how long the first media content item was displayed prior to the user switched the display to the second media content item. At 1010, control circuitry 410 retrieves from a database a second media characteristic of the second media content item. At 1012, control circuitry 410 generates a high characteristics score for the first media characteristics and low characteristics score for the second characteristics during the first time duration. At 1014, control circuitry 410 tracks user's behavior towards the currently displayed second media content item. At 1016, it is determined whether the user switched the display to a another media content item different from currently displayed second media content item. When at 1016, it is determined that the user did not switch the display, then control circuitry 410 continues to track the user's behavior at 1014. When at 1016, it is determined that user did switch the display, then at 1018, control circuitry 410 determines a second time duration of how long the second media content item was displayed prior to the user switched the display to the another media content item. At 1020, control circuitry 410 generates a high characteristics score for the second media characteristics and low characteristics score for the first media characteristics during the second time duration.

Figure 11:
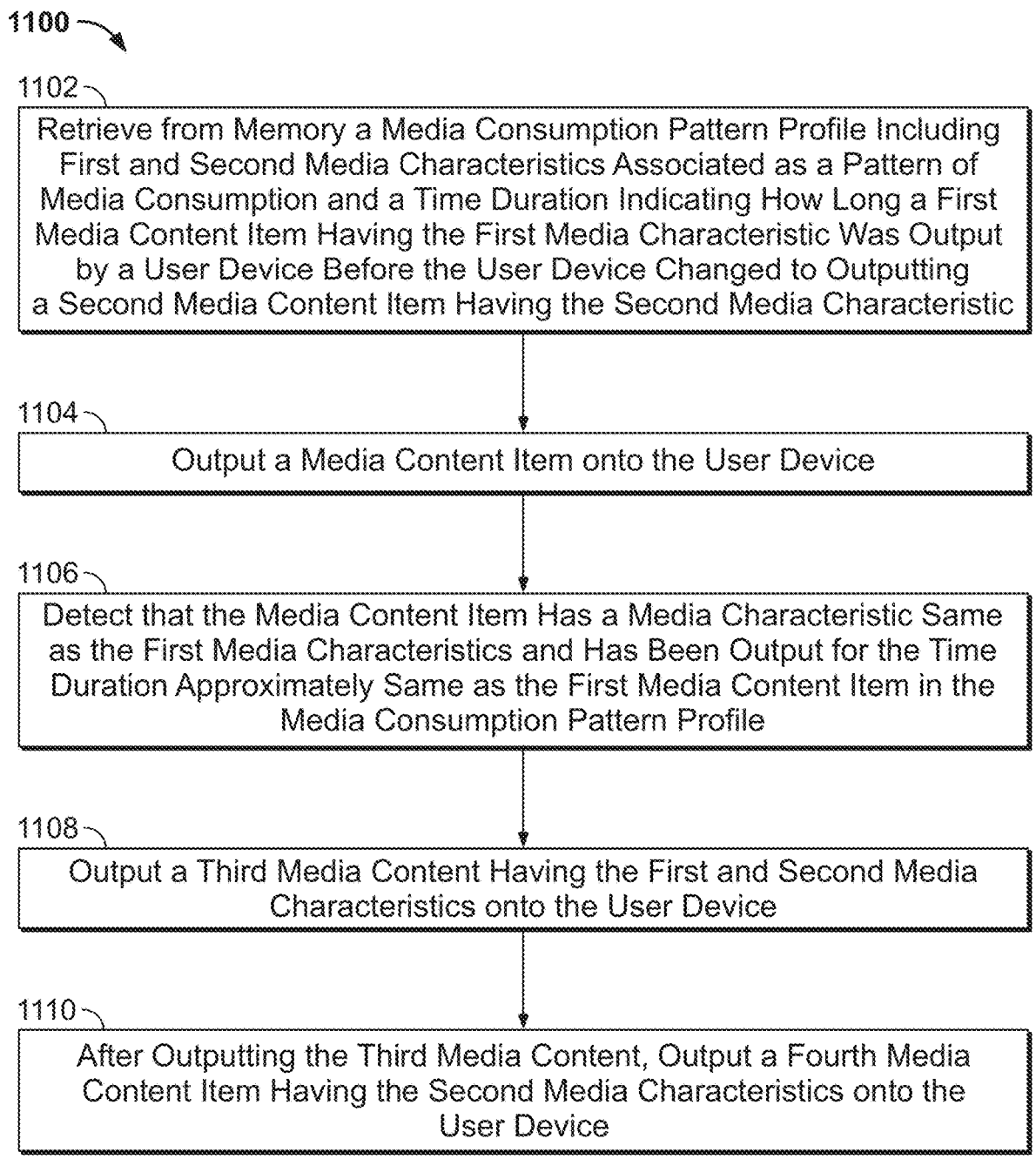
FIG. 11 depicts an illustrative flowchart of process for providing media content in accordance with some embodiments of the disclosure.

FIG. 11 depicts an illustrative flowchart of process 1000 for providing media content that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, the steps of process 1100 may be executed by the server 401 and/or by computing device 460 to provide media content.

At 1102, control circuitry 410 retrieves from memory a media consumption pattern profile including first and second media characteristics associated as a pattern of media consumption and a time duration indicating how long a first media content item having the first media characteristic was output by a user device before the user device changed to outputting a second media content item having the second media characteristic. At 1104, control circuitry 410 outputs a media content item onto the user device. At 1106, control circuitry 410 detects that the media content item has a media characteristic same as the first media characteristics and has been output for the time duration approximately same as the first media content item in the media consumption pattern profile. At 1108, control circuitry 410 outputs a third media content having the first and second media characteristics onto the user device. At 1110, after outputting the third media content, control circuitry 410, outputs a fourth media content item having the second media characteristics onto the user device.

Figure 12:
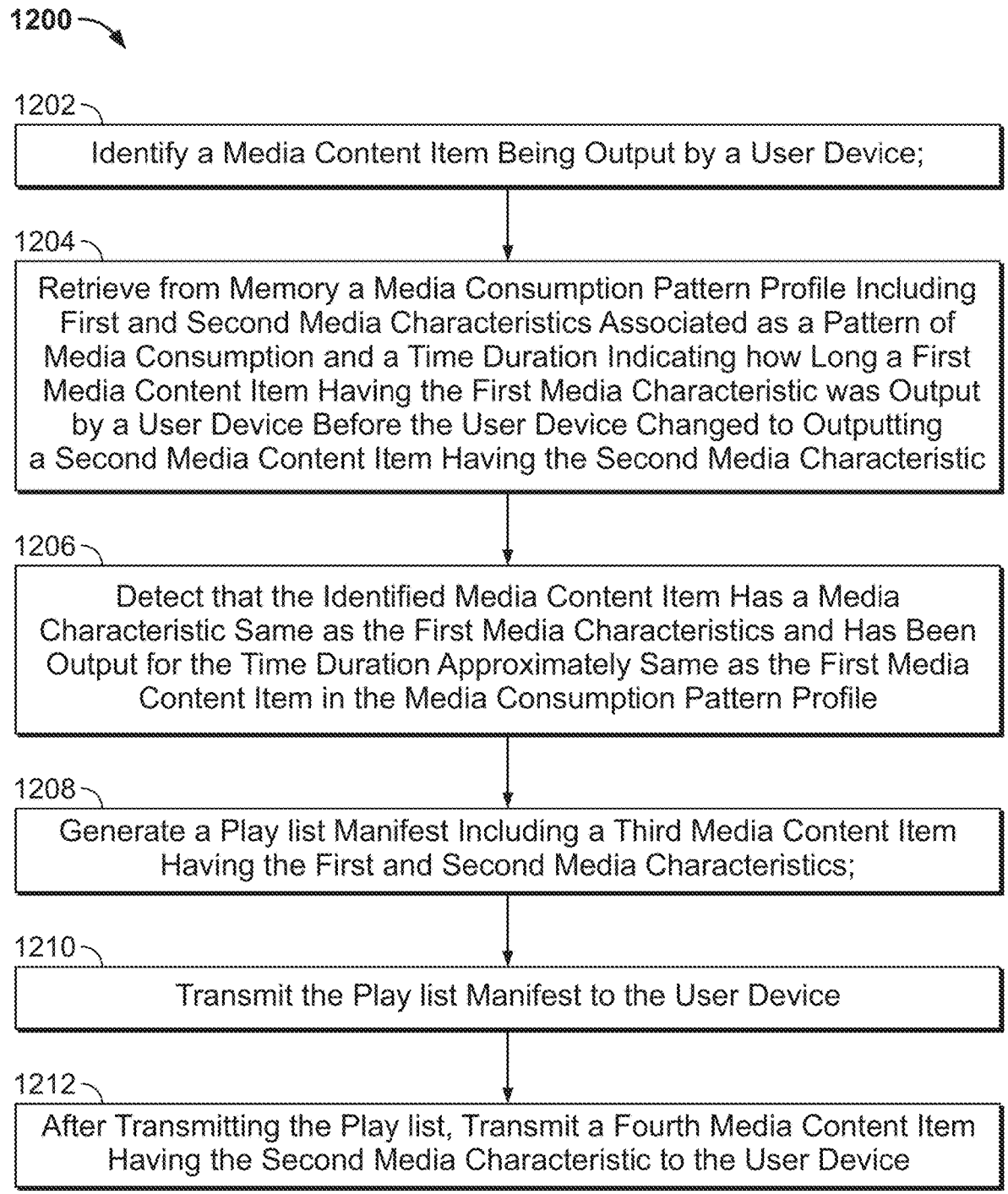
FIG. 12 depicts an illustrative flowchart of process for generating media consumption pattern profile.

FIG. 12 depicts an illustrative flowchart of process 1200 for providing media content that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500

(and of other processes described herein) as being implemented by certain components of systems 300 and 400, this is for purposes of illustration only, and it should be understood that other components of systems 300 and 400 may implement those steps instead. For example, the steps of process 1200 may be executed by the server 401 to provide media content.

At 1202, control circuitry 402 identifies a media content item being output by a user device. At 1204, control circuitry 402 retrieves from memory a media consumption pattern profile including first and second media characteristics associated as a pattern of media consumption and a time duration indicating how long a first media content item having the first media characteristic was output by a user device before the user device changed to outputting a second media content item having the second media characteristic. At 1206, control circuitry 402, detects that the identified media content item has a media characteristic same as the first media characteristics and has been output for the time duration approximately same as the first media content item in the media consumption pattern profile. At 1208, control circuitry 402 generates a playlist manifest including a third media content item having the first and second media characteristics. At 1210, control circuitry 402 transmits the playlist manifest to the user device. After transmitting the playlist, at 1212 control circuitry 402 transmits a fourth media content item having the second media characteristic to the user device.

The above-described embodiments of the present disclosure are presented for purposes of illustration and not of limitation, and the present disclosure is limited only by the claims that follow. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   determining that a device that is associated with a consumption pattern profile is playing a first media content item with a first media characteristic;
   analyzing the consumption pattern profile to determine that the device is likely to play one or more media content items with a second media characteristic after playing one or more media content items with the first media characteristic, and to identify a time duration indicating how long the one or more media content items with the first media characteristic was output, wherein the second media characteristic is different from the first media characteristic;
   based at least in part on the analyzing:
      identifying one or more second media content items, each of the one or more second media content items having the first media characteristic and the second media characteristic; and
      identifying a third media content item with the second media characteristic;
   causing the device to play the first media content item and the one or more second media content items for a total of at most a length of the identified time duration; and
   after the playing the first media content item and the one or more second media content items for the total of at most the length of the identified time duration, causing the device to play the third media content item.

2. The method of claim 1, wherein the analyzing the consumption pattern profile comprises:
   identifying the time duration indicating the length of time the one or more media content items with the first media characteristic were caused to be output to the device before, responsive to user input, the one or more media content items with the second media characteristic were caused to be output to the device, wherein the causing the device to play the third media content item is performed prior to an end of the time duration.

3. The method of claim 1, wherein the first media characteristic is a first media genre and the second media characteristic is a second media genre.

4. The method of claim 1, wherein the second media content item comprises a first set of media frames with the first media characteristic and a second set of media frames with the second media characteristic.

5. The method of claim 4, wherein the causing the output of the one or more second media content items comprises:
   outputting the first set of media frames to the device associated with the consumption pattern profile; and
   after outputting the first set of media frames, outputting the second set of media frames to the device associated with the consumption pattern profile.

6. The method of claim 1, wherein the analyzing the consumption pattern profile comprises retrieving a day of the week pattern of consumption or a time of the day pattern of consumption,
   wherein the determining that the device is likely to play the one or more media content items with the second media characteristic after the playing the one or more media content items with the first media characteristic is based at least in part on the retrieved day of the week pattern of consumption or the time of the day pattern of consumption.

7. The method of claim 6, wherein the determining that the device is likely to play the one or more media content items with the second media characteristic after the playing the one or more media content items with the first media characteristic is based at least in part on a time interval indicating, according to the retrieved day of the week pattern of consumption or the time of the day pattern of consumption, a length of time the one or more media content items with the first media characteristic were caused to be output to the device before, responsive to user input, the one or more second media content item with the second media characteristic were caused to be output to the device.

8. The method of claim 1, wherein the analyzing the consumption pattern profile comprises:
   retrieving a first genre strength for the second media characteristic and second genre strength for a third media characteristic different from the first media characteristic and from the second media characteristic,
   wherein the first genre strength indicates a likelihood that the device is likely to play the one or more media content items with the second media characteristic after the playing the one or more media content items with the first media characteristic, and the second genre strength indicates a likelihood that the device is likely to play one or more media content items with a third media characteristic after playing the one or more media content items with the first media characteristic,
   wherein the determining that the device is likely to play the one or more media content items with the second media characteristic after the playing the one or more media content items with the first media characteristic comprises determining that the first genre strength is greater than the second genre strength.

9. The method of claim 8, wherein the first genre strength is determined based at least in part on a frequency of the device playing the one or more media content items with the second media characteristic after the playing the one or more media content items with the first media characteristic, and
wherein the second genre strength is determined based at least in part on a frequency of the device playing the one or more media content items with the third media characteristic after the playing the one or more media content items with the first media characteristic.

10. The method of claim 1, wherein the identifying the third media content item is performed such that the third media content item has the second media characteristic and is without the first media characteristic.

11. A system comprising:
a memory configured to store a consumption profile associated with a device; and
processing circuitry configured:
to determine that the device associated with the consumption pattern profile is playing a first media content item with a first media characteristic;
analyzing the consumption pattern profile to determine that the device is likely to play one or more media content items with a second media characteristic after playing one or more media content items with the first media characteristic, and to identify a time duration indicating how long the one or more media content items with the first media characteristic was output, wherein the second media characteristic is different from the first media characteristic;
based at least in part on the analyzing:
identifying one or more second media content items, each of the one or more second media content items having the first media characteristic and the second media characteristic; and
identifying a third media content item with the second media characteristic;
causing the device to play the first media content item and the one or more second media content items for a total of at most a length of the identified time duration; and
after the playing the first media content item and the one or more second media content items for the total of at most the length of the identified time duration, causing the device to play the third media content item.

12. The system of claim 11, wherein the analyzing the consumption pattern profile comprises identifying the time duration indicating a length of time the one or more media content items with the first media characteristic were caused to be output to the device before, responsive to user input, the one or more second media content item with the second media characteristic were caused to be output to the device, wherein the causing the device to play the third media content item is performed prior to the end of the time duration.

13. The system of claim 11, wherein the first media characteristic is a first media genre and the second media characteristic is a second media genre.

14. The system of claim 11, wherein the second media content item comprises a first set of media frames with the first media characteristic and a second set of media frames with the second media characteristic.

15. The system of claim 14, wherein the causing the output of the one or more second media content items comprises: outputting the first set of media frames to the device associated with the consumption pattern profile; and
after outputting the first set of media frames, outputting the second set of media frames to the device associated with the consumption pattern profile.

16. The system of claim 11, wherein the analyzing the consumption pattern profile comprises retrieving a day of the week pattern of consumption or a time of the day pattern of consumption,
wherein the determining that the device is likely to play the one or more media content items with the second media characteristic after the playing the one or more media content items with the first media characteristic is based at least in part on the retrieved day of the week pattern of consumption or the time of the day pattern of consumption.

17. The system of claim 16, wherein the determining that the device is likely to play the one or more media content items with the second media characteristic after the playing the one or more media content items with the first media characteristic is based at least in part on a time interval indicating, according to the retrieved day of the week pattern of consumption or the time of the day pattern of consumption, a length of time the one or more media content items with the first media characteristic were caused to be output to the device before, responsive to user input, the one or more second media content item with the second media characteristic were caused to be output to the device.

18. The system of claim 11, wherein the analyzing the consumption pattern profile comprises retrieving a first genre strength for the second media characteristic and second genre strength for a third media characteristic different from the first media characteristic and from the second media characteristic,
wherein the first genre strength indicates a likelihood that the device is likely to play the one or more media content items with the second media characteristic after the playing the one or more media content items with the first media characteristic, and the second genre strength indicates a likelihood that the device is likely to play one or more media content items with a third media characteristic after playing the one or more media content items with the first media characteristic,
wherein the determining that the device is likely to play the one or more media content items with the second media characteristic after the playing the one or more media content items with the first media characteristic comprises determining that the first genre strength is greater than the second genre strength.

19. The system of claim 18, wherein the first genre strength is determined based at least in part on a frequency of the device playing the one or more media content items with the second media characteristic after the playing the one or more media content items with the first media characteristic, and
wherein the second genre strength is determined based at least in part on a frequency of the device playing the one or more media content items with the third media characteristic after the playing the one or more media content items with the first media characteristic.

* * * * *